United States Patent [19]

Koller et al.

[11] 4,234,516

[45] * Nov. 18, 1980

[54] METHOD OF ISOMERIZING HUMULONE TO ISOHUMULONE BY CATALYTIC ACCELERATION WITH METAL SALTS

[75] Inventors: Horst Koller, Munich; Alfons E. Hartl, Germering near Munich; Gerhard Kirchner, Grobenzell near Munich, all of Fed. Rep. of Germany

[73] Assignee: Atlantic Research Institute Limited, Nassau, The Bahamas

[*] Notice: The portion of the term of this patent subsequent to Jun. 10, 1992, has been disclaimed.

[21] Appl. No.: 582,774

[22] Filed: Jun. 2, 1975

Related U.S. Application Data

[63] Continuation of Ser. No. 356,785, May 3, 1973, Pat. No. 3,952,061, which is a continuation-in-part of Ser. No. 725,458, Apr. 30, 1968, abandoned.

[51] Int. Cl.$^3$ ............................................. C07C 45/00
[52] U.S. Cl. ...................................... 568/341; 426/600
[58] Field of Search .................... 260/586 D; 426/600

[56] References Cited

U.S. PATENT DOCUMENTS

| | | | |
|---|---|---|---|
| 2,647,837 | 8/1953 | Salac | 260/586 D |
| 3,044,879 | 7/1962 | Koch et al. | 260/586 D |
| 3,686,316 | 8/1972 | Verzele | 260/586 D |
| 3,923,897 | 12/1975 | Worden | 260/586 D |

FOREIGN PATENT DOCUMENTS 1158697  4/1968  United Kingdom ................ 260/586 D

*Primary Examiner*—Norman Morgenstern
*Attorney, Agent, or Firm*—Browdy and Neimark

[57] ABSTRACT

The isomerization of humulone or a humulone-containing material is carried out by isomerization at elevated temperature and a pH below 9 in a liquid medium containing at least one salt of a bi-valent metal or of cerium.

13 Claims, 5 Drawing Figures

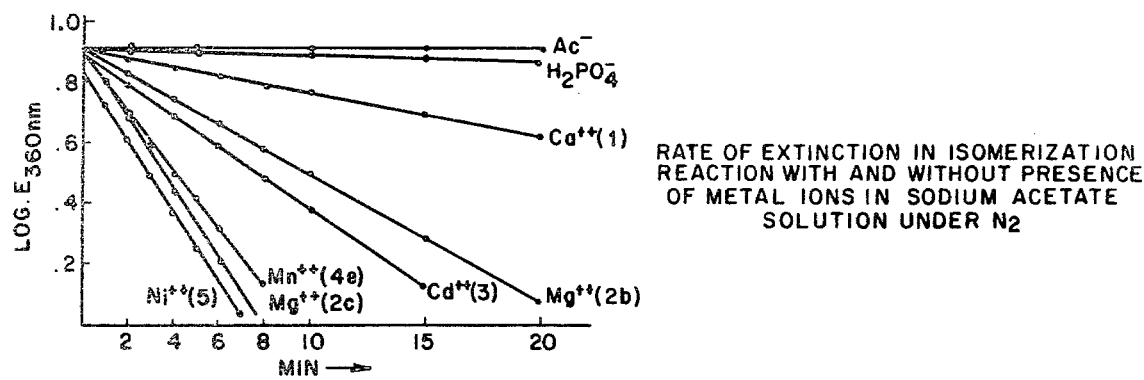

RATE OF EXTINCTION IN ISOMERIZATION REACTION WITH AND WITHOUT PRESENCE OF METAL IONS IN SODIUM ACETATE SOLUTION UNDER $N_2$

RATE OF EXTINCTION IN ISOMERIZATION REACTION WITH AND WITHOUT PRESENCE OF METAL IONS IN PURE METAL SALT SOLUTIONS UNDER $N_2$

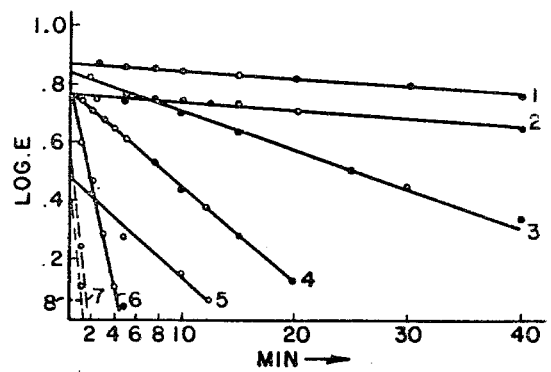

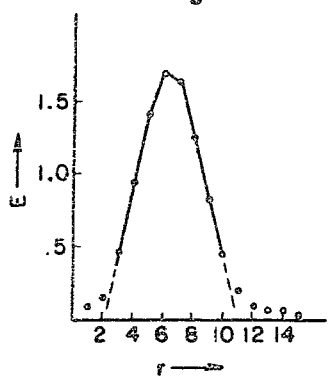

COUNTER-CURRENT DISTRIBUTION ANALYSIS OF ISOHUMULONE ISOMERIZED WITH $MgCl_2$ IN ACCORDANCE WITH THE PRESENT INVENTION

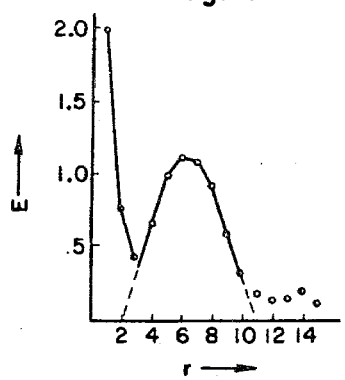

COUNTER-CURRENT DISTRIBUTION ANALYSIS ACCORDING TO THE PRIOR ART METHOD OF BOILING IN 0.2 N $Na_2CO_3$ AT pH 10

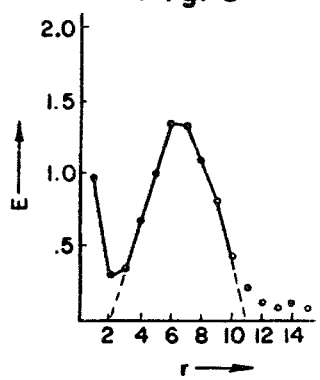

COUNTER-COUNTER DISTRIBUTION ANALYSIS ACCORDING TO THE PRIOR ART METHOD OF BOILING IN 0.1 N $Na_2CO_3$ AT pH 10

METHOD OF ISOMERIZING HUMULONE TO ISOHUMULONE BY CATALYTIC ACCELERATION WITH METAL SALTS

CROSS-REFERENCE TO RELATED APPLICATION

The present application is a continuation of application Ser. No. 356,785, filed May 3, 1973, now U.S. Pat. No. 3,952,061, which in turn was a continuation-in-part of application Ser. No. 725,458, filed Apr. 30, 1968, now abandoned. The entire contents of Ser. No. 725,458 are hereby incorporated by reference.

FIELD OF INVENTION

The present invention relates to a method of isomerizing humulone and more particularly to an improved method of preparing isohumulone from humulone rapidly and gently in pure from in high yield.

BACKGROUND OF INVENTION

It is known that lupulin, in contradistinction to humulone, has a pronounced retarding action with regard to tubercular bacteria. Isohumulone, which can be prepared by isomerization from humulone, on the other hand, has this tuberculosis retarding property to an even greater extent. Tests in vitro have shown that it is practically just as active as Conteben. However, it is of importance that isohumulone is tolerated without complaints. In addition to this important use, isohumulone can be used as a starting or intermediate product in chemistry.

Another use is in the brewing industry, since isohumulone represents the essential part of so-called hops bitters which are produced in the brewing process from the hops substances upon the so-called wort boiling. This isomerization by boiling takes place at a pH of about 5.5 and proceeds very slowly and incompletely. With a boiling time of up to 2 hours, the yield is at most 30–35%.

It would, therefore, be extremely desirable to be able to convert humulone rapidly and gently, but with high yield, into isohumulone. Since the twenties, it has been known that the isomerization of humulone upon boiling in aqueous alkaline solutions takes place with high speed and with substantially better yields (German Pat. No. 413,913). The isomerization is effected with aqueous soda or sodium hydroxide solution (OH ion concentration 1/10,000 and 1/1000 N respectively) by boiling for 30 minutes or 10 minutes respectively. A similar manner of operation is known from Pet. Journ. d. Brass. 1948, 679. Furthermore, isomerization reactions of humulone in aqueous alkaline carbonate and phosphate buffer solutions having pH values of 8–13 are known (U.S. Pat. Nos. 2,816,032 and 2,647,837 and British Pat. No. 855,401). In the last mentioned British patent it is shown that the isomerization of humulone proceeds with sufficient speed only starting with a pH of 9.0. In Australian Pat. No. 245,941 Hildebrand et al. describe the photochemical isomerization of humulone to isohumulone. The reaction, however, is not suitable for manufacture on a synthetic scale; it consumes a very large amount of energy and leads to uncontrollable secondary reactions.

The known relatively strong alkaline isomerization of humulone to isohumulone has the disadvantage that the conversion can frequently proceed beyond isohumulone to undesired compounds, for instance, humulonic acid. The examination by use of thin-layer chromatography of isohumulone preparations obtained by alkaline isomerization of pure humulone shows that a large number of reaction products are produced whose nature is to the greatest part not yet clarified. In order to obtain a pure isohumulone therefore an expensive purifying operation, such as, for instance, counter-flow distribution is necessary.

SUMMARY OF THE INVENTION

It is accordingly an object of the present invention to avoid the disadvantages of the prior art, such as discussed hereinabove.

It is another object of the present invention to provide for the rapid, gentle production of isohumulone by isomerization of humulone.

It is still another object of the present invention to rapidly and gently isomerize humulone avoiding the use of highly alkaline solutions.

It has now been found that the isomerization of humulone, for instance, in the form of the pure compound or in the form of humulone-containing material, to isohumulone can be considerably accelerated by the addition of salts of polyvalent metals.

DESCRIPTION OF THE DRAWING

For a better understanding of the invention, possible embodiments thereof will now be described with reference to the attached drawing, it being understood that these embodiments are exemplary and in no way limitative.

FIG. 1 is a graph plotting the logarithm of the humulone extinction (Log E) against the reaction time in minutes (min) in an isomerization reaction with and without the presence of metal ions in sodium acetate solution under $N_2$ (humulone $7 \times 10^{-5}$ mol/l.; water-methanol 85:15).

FIG. 2 is a graph plotting the logarithm of the humulone extinction (Log E) against the reaction time in minutes (min) in an isomerization reaction with and without the presence of metal ions in pure metal salt solutions under $N_2$ (humulone $5-6 \times 10^{-5}$ mol/l; water-methanol 95:5).

FIG. 3 is a graph plotting the extinction (E) versus the fraction number (r) in a countercurrent distribution analysis of isohumulone isomerized with $MgCl_2$ in accordance with the present invention.

FIG. 4 is a graph plotting the extinction (E) versus the fraction number (r) in a countercurrent distribution analysis of isohumulone isomerized according to the prior art, i.e., boiling 0.2 N sodium carbonate solution at pH 10.

FIG. 5 is a graph plotting the extinction (E) versus the fraction number (r) in a countercurrent distribution analysis of isohumulone isomerized according to the prior art, i.e., boiling 0.1 N sodium carbonate at pH 10.

DESCRIPTION OF PREFERRED EMBODIMENTS

The method of the invention for the production of isohumulone by isomerization of humulone-containing material at elevated temperature in a liquid medium consists accordingly in accelerating the isomerization by addition of at least one salt of a bivalent metal or of cerium.

Although in the parent application, Ser. No. 725,458, the salt of the bivalent metal has been used in an amount of at least 2 equivalents per equ. of humuione it had been stated that the salt of a bivalent metal acted as a catalyst. The true mechanism of the isomerization reaction has since been discovered. It is now known that the metal ion does not act as a catalyst in the classical sense, but in fact, forms a complex with the humulate ion. This complex may be quickly and easily isomerized at elevated temeratures. Although the isohumulone complex may be used directly in many applications, such as brewing, pure isohumulone is released upon the acidification step of conventional working up methods.

The anionic portion of the salt has no effect on the isomerization. The sole requirement for the salt used is that it dissociate in solution to form an anionic part and a cationic part. The anionic part need only be inert to the starting material and inert to the isohumulone products produced under the operating conditions of the isomerization reaction. The cationic part must be a cation of a bivalent metal or cerium. Groups IIA, IIB or the iron group of the periodic system or of cerium or manganese are preferable and Mg, Ca, Sr, Zn, Ce and Mn cations are particularly favorable.

In the case of some of these salts, the cations, for example Ba or the anions, for example, thiocyanate, must be excluded due to the naturally toxocological consideration if the isohumulone product produced is to be used in the foodstuff industry. Nevertheless, its suitability for further use in the chemical industry, as for example, a reference standard for the determination of purity of isohumulone made by other processes, is possible. Usage as a reference standard is possible because of the extremely high degree of purity of the isohumulone produced by the present process. Similarly, certain anions may be oxidizing, as for example, perchlorate, or reducing in working up of the isohumulone produced. This fact, however, does not rule out their possible use when the isohumulone product is to be used as formed without the necessity of a working up step.

The following are examples of salts which may be used with the present invention: barium acetate, barium bromide, barium butyrate, barium chlorate, barium chloride, barium citrate, barium fluoride, barium formate, barium malate, barium nitrate, barium propionate, barium succinate, nickel nitrate, nickel sulfate, nickel acetate, nickel benzosulfonate, nickel bromide, nickel chloride, nickel iodide, cadmium pyrophosphate, cadmium sulfate, cadmium acetate, cadmium benzoate, cadmium bromide, calcium butyrate, calcium chlorate, calcium chloride, calcium formate, calcium iodide, calcium lactate, calcium maleate, calcium nitrate, calcium nitrite, calcium propionate, calcium salicylate, calcium valerate, cobalt chloride, cobalt fluoride, cobalt iodide, cobalt acetate, cobalt nitrate, cobalt sulfate, magnesium chloride, magnesium citrate, magnesium formate, magnesium iodide, magnesium lactate, magnesium nitrate, magnesium sulfate, magnesium acetate and magnesium sulfite.

It should be understood that the above list is in no way meant to be limitative and all salts fulfilling the requirements set forth above will be operable with the present invention.

The stoichiometric quantity of salt to humulone for the formation of the complex is one mole of bivalent metal cation for each mole of humulate anion. Although the formation of any amount of complex will speed the isomerization of that amount of humulone, it is preferable to add a stoichiometric amount or an excess of salt to assure complete isomerization.

The acceleration of the isomerization in accordance with the present invention is particularly striking at pH values of between 4 and 8. Without the addition of these metal salts, the reaction takes place only very slowly and incompletely at these pH values (cf. FIGS. 1 and 2 and examples 8 and 9 below). For the characterization of this acceleration of the conversion of humulone to isohumulone, reaction-kinetic experiments at different temperatures are shown in the accompanying figures. As reaction media there is used an 0.1 and 0.025 molar sodium acetate solution to which there are added in each case the metal salts in concentrations of $10^{-3}$ mol/liter and $10^{-4}$ mol/liter, respectively. Furthermore, pure metal salt solutions of higher concentration (0.025 mol/liter) (FIG. 2) of different pH were also used for the conversion of the humulone. In this way, as can be noted from the figures, an additional acceleration of reaction can frequently be obtained.

By way of comparison, the slow isomerization reaction in pure phosphate buffers is also recorded. It should be emphasized that the sodium acetate in the reaction solutions is not necessary for the reaction itself, but merely serves to maintain the pH constant. In this way it can be shown that with the same pH the accelerating activity of the different metal salts is somewhat different. However, the salts of all the metals indicated above can be used to advantage for the acceleration of the isomerization. For FIGS. 1 and 2, the logarithm of the humulone extinction measured in a spectral photometer was plotted against the reaction time (in accordance with the law of Lambert and Beer, the extinction is directly proportional to the concentration).

As can be noted from the figures, salts of the metals Mg, Ca and Mn are particularly active. These metals are therefore preferred, the pH being preferably about 7 in the case of the alkaline earths.

The isomerization, to be sure, takes place normally at elevated temperature particularly at the boiling point of the solvent or dispersing agent, and preferably aqueous alcohol, but it has been found that even at temperatures of only 50° C. a definite acceleration is still present. At the temperatures of aparticular interest, about 80 to about 100° C. (the boiling point of the water-alcohol mixtures preferably used and particularly of the 1:1 mixture, is between about 80 and about 98° C.), the reaction is normally complete in a few minutes and need be extended only in the rarest cases to more than 15 minutes, even in the case of relatively high concentrations. A time interval of $2\frac{1}{2}$ to 10 minutes is best in the case of the preferred metals.

As reaction medium any liquid may be used in which the salt being used dissociates to form a metallic cation and an anion and in which the humulone or humulone containing material dissociates to form humulate anion. The liquid medium must, of course, be otherwise inert to the starting materials and products produced at the operating conditions. It is stated in the parent application, Ser. No. 725,458, incorporated by reference hereinabove, that "one can in principle use water to which, however, a water-miscible organic solvent is added as solubilizer, since humulone itself is practically insoluble in water." Water alone may be used, as humulone is very slightly soluble in water, but it is preferred to use a mixture of water and an organic solvent in which humulone is soluble.

Examples of media usable with the present invention include: ethanol; methanol; acetone; mixtures of water and ethanol, methanol, isoproponol, secondary butanol, acetone, lower aliphatic (C$_1$-C$_6$) alcohols, acetonitrile ether, hydrocarbons which are liquid under ordinary conditions (e.g. C$_6$-C$_{12}$), chlorinated hydrocarbons, benzene, xylene and toluene. The hydrocarbons including chlorinated hydrocarbons and benzene, toluene and xylene are preferably used in mixture with a polar solvent miscible therewith for easier production of the humulate anion. Again, it is to be understood that the present list is not meant to be limitative and all inert liquid compounds or liquid mixtures which fulfill the above requirements will be operable in the present invention.

The acceleration by the addition of metal salts of the quantitative conversion of humulone to isohumulone is not, however, the only advantage over the previously known methods of procedure. The samples of isohumulone obtained in the reaction of the invention are also obtained in particularly pure form, as can be noted from their thin-layer chromatogram and also in the countercurrent distribution analysis of the isooctane-phosphate citrate buffer system (FIG. 3).

A comparison of FIGS. 3, 4 and 5 shows the following:

FIG. 3 shows isohumulone isomerized according to the present invention with MgCl$_2$ according to example 1 set forth hereinbelow. It may be seen that there is only one sharp peak which means that the substance is very pure. If there were a contamination by other substances this would show in one or more further peaks before or after the main peak, i.e. in the first or last frictions analyzed.

FIGS. 4 and 5 show isohumulone which was isomerized according to prior art. Both products contain considerable impurities due to further degradation of isohumulone. Isomerization with 0.2 N sodium carbonate gives a product consisting of about half humulinic acid as may be seen by the peak in fractions 1-3 and which has been produced by a secondary reaction of isohumulone. FIG. 5 still shows a considerable amount of humulinic acid in fractions 1 and 2. FIG. 4, which shows the product of isomerization starting from pure humulone actually is almost identical with the curve of a mixture 1:1 of humulinic acid and isohumuline which means that about half the yield in isohumulone is lost by a secondary reaction leading to humulinic acid. FIG. 5 still shows a considerable amount of humulinic acid with an attendant loss in yield. This applies for all alkaline isomerization reactions in which pH must be well over 9 to get a reasonable speed of the reaction. FIGS. 3, 4 and 5 may be directly compared as extinction (E) shown on the ordinate is given in the same units in each Figure as well as is the number of fractions shown on the abscissa. All three analyses were made in the same apparatus and each fraction was identical in all three figures.

The complexing isomerization of the present invention, in contradistinction to alkaline isomerization, gives a practically quantitative yield of isohumulone, namely at least 95%, as compared with about 79% with the best known alkaline hydrolysis methods.

The isomerization mixtures may be worked up in the customary manner. The reaction medium is acidified in the customary manner, preferably with dilute acid, to a PH of 2, and extracted with a solvent for isohumulone. After the drying of the solvent extract and the distilling off of the solvent, the isohumulone remains.

The following examples will serve to further explain the invention.

EXAMPLE 1

Isohumulone from Humulone

A solution of 6.1 g of MgCl$_2$.6H$_2$O ($3 \times 10^{-2}$ mol) in 50 ml of water are charged into a 50 ml 4-neck flask with agitator and reflux condenser, dip single-bar electrode for the measure of the pH and nitrogen feed tube (instead of MgCl$_2$, MgSO$_4$ was also used and led to the same results). Through this solution there is conducted, as inert gas, a slow stream of nitrogen. 3.63 g of humulone ($10^{-2}$ mol) are dissolved in 120 ml of ethanol, brought to a pH of 7.5-8 with 1 N aqueous caustic soda solution and charged into the reaction flask. The pH of the reaction solution is adjusted by a few drops of caustic soda solution to 7.5-8 with agitation and continued passage of nitrogen. Thereupon, the reaction mixture is heated for 10 minutes at the boiling point on an oil bath which has been pre-heated to 110° C. (b.p. 80° C.).

After the cooling of the solution, it is acidified with dilute sulfuric acid to a pH of 2.0 and extracted with ether. After the drying of the ether extract with sodium sulfate and the distilling off of the solvent in the rotary evaporator, there remains in the flask 3.45 g of a light yellow oil (i.e., 95% of the theoretical yield) which crystallizes upon standing in a refrigerator. By recrystallization from iscooctane, there precipitates colorless crystals of m.p. =56° to 60° C. The isohumulone obtained in this manner corresponds, on the basic of analytical data (UV spectrum, elementary analysis, thin-layer chromatogram), with preparations prepared by previously customary methods and exhibits a typical bitter isohumulone taste.

EXAMPLE 2

Production of an Isomerized Hops Extract

In the reaction apparatus described in Example 1, 6.1 g of MgCl$_2$.6H$_2$O ($3 \times 10^{-2}$ mol) are dissolved in 40 ml of water with the passage of nitrogen. 10.0 g of a hops extract which contains about 40% humulone are dissolved in 120 ml of ethanol and the insoluble components possibly filtered off. The ethanolic solution of the hops extract is treated with 15 ml of aqueous 1 N caustic soda solution in order to adjust the pH and then charged into the reaction flask. Thereupon the pH of the reaction mixture is adjusted to 7.5 by stirring and passage of nitrogen and boiled for 10 minutes under reflux. The working up of the reaction batch is effected in the manner described in Example 1. After the isomerized hops extract obtained in this manner has been examined by the customary methods, such as thin-layer chromatography, column chromatography on polyamide powder and spectral photometric determination, it was determined that the humulone contained in the starting product had been converted with a 90% yield into isohumulone.

EXAMPLE 3

In the reaction apparatus described in Example 1, 4.1 g of sodium acetate ($5 \times 10^{-2}$ mol) and 0.262 g nickel sulfate ($10^{-3}$ mol) are dissolved in 50 ml of water with stirring and passage of nitrogen. 0.363 g of humulone ($10^{-3}$ mol) are dissolved in 50 ml of ethanol, adjusted with 1 ml of aqueous 1 N caustic soda solution and charged into the reaction flask. The reaction mixture is heated to boiling point for 10 minutes under reflux. The pH, which at the start of the reaction is 7.5, drops during the reaction to 7. After cooling to room temperature, it is acidified with dilute sulfuric acid to a pH of 2 and extracted with ether. The further working up is effected in the same manner as in Example 2. After the distilling off of the ether, 035 g, i.e. 96% of the theoretical yield, of an oily product remains in the flask.

EXAMPLE 4

Isomerization of the Humulone Contained In Hop Cones 50 g of ground hops containing 4.7% humulone are heated for 10 min. at boiling point in 500 ml of ethanol, the extraction solution is filtered off and the residue washed twice with about 200 ml of ethanol. The filtrate is concentrated until a humulone content of 3% is reached. This corresponds to a total resin content of about 10%.

In the reaction apparatus described in Example 1, 3 g $MgCl_2.6H_2O$ are dissolved in 25 ml of water. With the introduction of nitrogen, 60 ml (corresponding to 1.8 g of humulone) of the above described extract are added to this solution. With 1 N NaOH, the pH is adjusted to 8 and the mixture then rapidly heated.

At 50° C., upon reaching the boiling point (79.5° C.) and 2½, 5, 7½ and 10 minutes after the starting of the boiling, control samples are taken. Examination of these control samples by thin-layer chromatography and spectral photometry showed that the humulone had been converted into isohumulone in 7½ minutes. The pH dropped to 7.2 during the isomerization.

EXAMPLES 5 through 7

The experiments were carried out in the same manner as in Example 3. As metal salts there were used in each case 0.136 g ZnCl ($10^{-3}$ mol), 0.198 g $MnCl_2.4H_2O$ ($10^{-3}$ mol) or 0.266 g Cd acetate ($10^{-3}$ mol). The reaction conditions and the quantities of the other components are the same as in Example 3. After about twenty minutes, the conversion is practically complete.

EXAMPLES 8 through 9

The experiments were carried out in the manner described in Example 1. Instead of $MgCl_2$ there are used as reaction accelerators in each case 4.46 g $CaCl_2.2H_2O$ ($3\times10^{-2}$ mol) and 7.3 g $BaCl_2.2H_2O$ ($3\times10^{-2}$ mol) respectively. The reaction conditions and the quantities of the other components are the same as in Example 1. After about 10 minutes, the conversion is practically complete.

By the expressions humulone and isohumulone there is to be understood here, as customary, the mixture of alpha acids or the isomers thereof.

Table I shows the results of these experiments as are set forth in FIG. 1.

TABLE I

| Curve | Buffer 0.1 m/l Metal Salt 0.01 m/l | Temp. °C. | pH at the Temp. °C. | Half-Life |
|---|---|---|---|---|
| $H_2PO_4$ | phosphate | 98.5 | 5.5 | 2 hours |
| $Ac^-$ | acetate | 80 | 7.0 | 6 hours |
| 1 | acetate + $CaCl_2$ | 80 | 8.0 | 22 min. |
| 2b | acetate + $MgCl_2$ | 80 | 7.5 | 7.3 min. |
| 2c | acetate + $MgCl_2$ | 80 | 8.0 | 2.6 min |
| 3 | acetate + $CdCl_2$ | 70 | 7.0 | 5.9 min. |
| 4e | acetate + $MnCl_2$ | 70 | 7.5 | 3.2 min. |

TABLE I-continued

| Curve | Buffer 0.1 m/l Metal Salt 0.01 m/l | Temp. °C. | pH at the Temp. °C. | Half-Life |
|---|---|---|---|---|
| 5 | acetate + $NiSO_4$ | 70 | 6.5 | 2.5 min. |

Table II shows the results of the experiments set forth in FIG. 2. As reaction medium there were used in each case 95 ml of the corresponding aqueous metal salt solution to which the humulone (2 mg) dissolved in 5 ml of methanol was added.

TABLE II

| Curve | Reaction Solution 0.025 m/l | Temp. °C. | pH 25° C. | Half-Life about |
|---|---|---|---|---|
| 1 | phosphate buffer | 98 | 7.2 | 100 min. |
| 2 | phosphate buffer | 98 | 5.5 | 100 min. |
| 3 | $MgCl_2$ | 50 | 8.0 | 24 min. |
| 4 | $BaCl_2$ | 98 | 6.9 | 9 min. |
| 5 | $CeCl_3$ | 98 | 4.2 | 10 min. |
| 6 | $CaCl_2$ | 98 | 6.6 | 2 min. |
| 7 | $MgCl_2$ | 98 | 8.0 | 0.7 min. |
| 8 | $NiSO_4$ | 98 | 4.7 | 0.7 min. |

The invention in its broader aspects is not limited to the specific steps, methods and compositions described, but departures may be made therefrom within the scope of the accompanying claims without departing from the principles of the invention and without sacrificing its chief advantages.

What is claimed is:

1. A method for preparing isohumulone products, comprising:
   providing a mixture of (1) a salt productive in an aqueous medium of an anion and a cation, said anion being inert to the starting material and inert to the isohumulone products under the operating conditions of the present method, and said cation being an element selected from the group consisting of Group IIa or IIb elements, Fe group elements, cerium and manganese, (2) humulone or a humulone-containing material, and (3) a liquid medium, inert to the starting materials and to the isohumulone produced under the operating conditions of the present method, said liquid medium being one in which said salt dissociates to form said anion and said cation and said humulone or humulone-containing material dissociates to form humulate anion; and
   isomerizing at an elevated temperature, at a pH below 9 and greater than that pH at which humulone forms humulate anion in solution;
   wherein said salt is present in an amount sufficient to accelerate said isomerization.

2. A method in accordance with claim 1 wherein said cation is magnesium, calcium, strontium, zinc, cerium or manganese.

3. A method in accordance with claim 1 wherein said isomerizing step is carried out at a pH of 4-8.

4. A method in accordance with claim 1 wherein said liquid medium comprises aqueous methanol or aqueous ethanol.

5. The method in accordance with claim 1 wherein said isomerizing step is carried out at the boiling point of the system.

6. The method in accordance with claim 1 wherein said isomerizing step is carried out for a period of 2½ to 15 minutes.

7. The method in accordance with claim 1 wherein said anion is acetate, bromide, butyrate, chlorate, chloride, citrate, fluoride, formate, malate, nitrate, propionate, succinate, sulfate, benzosulfonate, iodide, pyrophosphate, benzoate, lactate, maleate, nitrite, salicylate, valerate, citrate or sulfite.

8. The method in accordance with claim 1 wherein said salt is $NiSO_4$, $MgCl_2$, $CaCl_2$ or $MnCl_2$.

9. The method in accordance with claim 1 wherein said salt is present in an amount of at least one mole per mole of humulone or humulone containing material.

10. A method in accordance with claim 1, wherein said humulone-containing material is hop cones or hop extract.

11. A method in accordance with claim 1, wherein said liquid medium includes water.

12. A method of preparing isohumulone products, comprising:

combining (1) humulone or humulone-containing material, (2) a liquid medium inert to the reaction materials, in which both humulone and the salt to be used are soluble, and (3) a salt productive in said liquid medium of an elemental cation of an element selected from the group consisting of Group II$a$ or II$b$ elements, Fe group elements, cerium and manganese in an amount sufficient to accelerate isomerization; and isomerizing at an elevated temperature, at a ph lower than about 9 and above 4.

13. A method of preparing isohumulone products, comprising:

combining (1) humulone or humulone-containing material, (2) a liquid medium in which both humulone and the salt to be used are soluble, and (3) a salt productive in said liquid medium of an elemental cation of an element selected from the group consisting of Group II$a$ or II$b$ elements, Fe group elements, cerium and manganese in an amount sufficient to accelerate isomerization; and isomerizing at an elevated temperature, at a pH lower than about 9 and above 4.

* * * * *